(12) United States Patent
Bao et al.

(10) Patent No.: US 11,201,731 B2
(45) Date of Patent: Dec. 14, 2021

(54) METHOD AND APPARATUS FOR ASYMMETRIC CRYPTOSYSTEM BASED ON QUASI-CYCLIC MODERATE DENSITY PARITY-CHECK CODES OVER GF(Q)

(71) Applicant: Zenith Electronics LLC, Lincolnshire, IL (US)

(72) Inventors: Kyle Xingkai Bao, Glenview, IL (US); Nejib Ammar, Vernon Hills, IL (US)

(73) Assignee: Zenith Electronics LLC, Lincolnshire, IL (US)

(*) Notice: Subject to any disclaimer, the term of this patent is extended or adjusted under 35 U.S.C. 154(b) by 360 days.

(21) Appl. No.: 16/117,602

(22) Filed: Aug. 30, 2018

(65) Prior Publication Data

US 2020/0028674 A1 Jan. 23, 2020

Related U.S. Application Data

(60) Provisional application No. 62/589,250, filed on Nov. 21, 2017.

(51) Int. Cl.
*H04L 9/30* (2006.01)
*H04L 9/08* (2006.01)
*H03M 13/11* (2006.01)
*H03M 13/00* (2006.01)
*H04L 9/06* (2006.01)

(52) U.S. Cl.
CPC ....... *H04L 9/0825* (2013.01); *H03M 13/1148* (2013.01); *H03M 13/6516* (2013.01); *H04L 9/0637* (2013.01); *H04L 9/304* (2013.01)

(58) Field of Classification Search
CPC . H04L 9/08; H04L 9/0825; H04L 9/30; H04L 9/304; H04L 9/3093; H04L 9/06; H04L 9/0637; H04M 13/1148; H04M 13/6516; H04M 13/1171; H04M 13/63; H04M 13/116; H04M 13/1174; H04M 13/118; H04M 13/1182; H04M 13/1185; H04M 13/15; H04M 13/156
See application file for complete search history.

(56) References Cited

U.S. PATENT DOCUMENTS 10,230,396 B1 * 3/2019 Micheloni ......... H03M 13/6583
2002/0003877 A1 * 1/2002 Katayanagi ............. H04L 9/302
380/30

(Continued)

OTHER PUBLICATIONS

Khadijeh Bagher, An Efficient Public Key Encryption Scheme Based on QC-MDPC Lattices, Oct. 2017, IEEE, Voume 5, pp. 25527-25541 (Year: 2017).*

*Primary Examiner* — Kristine L Kincaid
*Assistant Examiner* — Shaqueal D Wade
(74) *Attorney, Agent, or Firm* — Schiff Hardin LLP (57) ABSTRACT

Methods and apparatus for code-based asymmetric cryptosystem using Quasi-Cyclic Moderate-Density Parity-Check (QC-MDPC) error correcting codes. Specifically, the method and apparatus generalizes the framework of (QC-MDPC) Code-Based (CB) cryptography from the binary domain (Galois Field of two elements) to an arbitrary size of Galois Field and provides an apparatus for implementing the cryptosystem with a simplified computational complexity of key generation, encryption, and decryption components of the cryptosystems and reduced sizes of the public and private security keys.

8 Claims, 6 Drawing Sheets

(56) References Cited

U.S. PATENT DOCUMENTS

| | | | |
|---|---|---|---|
| 2006/0095491 A1* | 5/2006 | Abe | G06F 17/142 708/400 |
| 2014/0105403 A1* | 4/2014 | Baldi | H04L 9/304 380/282 |
| 2015/0163060 A1* | 6/2015 | Tomlinson | G09C 1/00 380/30 |
| 2015/0381205 A1* | 12/2015 | Zhang | H03M 13/6502 714/773 |
| 2017/0149444 A1* | 5/2017 | Lin | H03M 13/2757 |
| 2017/0324554 A1* | 11/2017 | Tomlinson | H04L 9/0618 |

* cited by examiner

METHOD AND APPARATUS FOR ASYMMETRIC CRYPTOSYSTEM BASED ON QUASI-CYCLIC MODERATE DENSITY PARITY-CHECK CODES OVER GF(Q)

CROSS-REFERENCE TO RELATED APPLICATION

The present application claims the benefit of U.S. Provisional Patent Application Ser. No. 62/589,250 filed Nov. 21, 2017, which application is incorporated herein by reference.

BACKGROUND OF THE INVENTION

Field of the Invention

The present invention relates generally to encryption/decryption of messages for cybersecurity and, in particular, to code-based quantum-safe asymmetric cryptography including key generation, encryption, and decryption to improve post-quantum asymmetric cryptosystems based on Quasi-Cyclic Moderate Density Parity-Check Codes (QC-MDPC).

Description of the Related Art

A. McEliece Code-Based Cryptosystem

Code-based cryptosystems date back to the late 1970's with the introduction of the McEliece asymmetric cryptosystem. The original McEliece cryptosystem is based on binary Goppa codes, an algebraic geometric code. As an asymmetric cryptosystem, it makes use of a pair of keys, a private key that is kept secret and a public key that need not be kept secret to perform its encryption operations.

In McEliece key generation based on binary Goppa codes, a binary Goppa code generator matrix G together with scrambling and permutation binary matrices S and P, respectively, are used as the private key set (G, S, P). The public key is a binary matrix $\breve{G}$ that has been derived from the private key components by scrambling and permuting the generator matrix G with the scrambling matrix S and the permutation matrix P according to the following equation.

$$\breve{G}=SGP$$

The public key $\breve{G}$ may be published without revealing the private key components G, S and P.

In an example, consider two communicating parties referred to as "Alice" and "Bob" who are engaging in a secure communication over a non-secure communications channel. When "Alice" wants to communicate a secure message to the recipient "Bob" through a non-secure communication channel, the message to be sent to Bob (a plaintext message) m is encrypted by Alice into a binary ciphertext c using Bob's published public key. The encryption is performed by encoding the plaintext message m using Bob's public key $\breve{G}$ and adding an intentional error vector e, as illustrated by the following equation.

$$c=m\breve{G}+e$$

Alice then sends the resulting encoded ciphertext c to Bob over the non-secure communication channel. Upon receiving Alice's ciphertext c, Bob recovers the plaintext message m using decryption. The message m may described as having been sent through the trap door (which is a function that is easily computed in one direction yet difficult to compute in the opposite direction without special information). The message is recovered by the following steps: First Bob reverses the permutation step using the secret permutation matrix P, hence yielding a vector $\acute{c}$ according to the following equation.

$$\acute{c}=cP^{-1}$$

Then Bob decodes the vector $\acute{c}$ into the appropriate codeword $\acute{m}$ using the decoding algorithm for the code generated by the generator matrix G. One of the best-known algorithms to use for decoding Goppa codes is the Peterson decoding procedure. Finally, Bob de-scrambles the codeword $\acute{m}$ using the scrambling matrix S to obtain the plaintext message that was sent from Alice according to the following equation.

$$m=\acute{m}S^{-1}$$

The code-based cryptosystem introduced by McEliece has demonstrated an excellent level of security by resisting cryptanalysis to this day. In particular, it is immune to quantum computing attacks using Shor's Algorithm, unlike currently deployed asymmetric cryptosystems such as the RSA (Rivest-Shamir-Adleman) cryptosystem and the ECC (elliptic curve cryptography) cryptosystem. Additionally, the McEliece system encryption and decryption speeds outperform the RSA and ECC asymmetric cryptosystems. The major drawback of the original McEliece asymmetric crypto system, however, is that large size keys are used, which makes the McEliece system very difficult to use in practical situations. For example, the McEliece cryptosystem requires a public key size of larger than one megabits in order to achieve an 80 bit security level.

B. Binary QC-MDPC Code-Based Cryptosystem

To reduce the size of the public key without compromising the code-based cryptosystem security level, several families of error correcting codes have been proposed as alternatives to the binary Goppa codes. The smaller size public keys are used in order to provide more efficient and practical cryptosystems. These proposed systems include BCH (Bose, Chaudhuri, and Hocquenghem) codes, Reed-Solomon codes, quasi-cyclic low-density parity-check (QC-LDPC) codes, and binary quasi-cyclic moderate-density parity-check (QC-MDPC) codes. With the exception of the binary QC-MDPC scheme, these modified cryptosystems have suffered security failures due their inherent structure which results in leaked information about the private key.

The binary QC-MDPC code-based cryptosystem uses a binary random moderate-density parity-check matrix H as its private key and the corresponding binary generator matrix G as the public key. The QC (quasi-cyclic) H matrix is defined by its dimensions m×n such that $$n_0 = \frac{n}{m}$$

is an integer, and by its row weight w.

The H matrix consists of $n_0$ number of quasi-cyclic blocks $H_i$ that are assembled into the H matrix according to the following equation.

$$H=|H_0|H_1|\ldots|H_{n_0-1}|$$

The private key, (i.e. the H matrix) of the binary QC-MDPC system is constructed by first randomly choosing a binary row vector h of length n and of weight w. The first row of H is set to h, while its remaining m−1 rows are obtained by m−1 quasi-cyclic shifts of the vector h.

The corresponding public key, i.e. the k×n binary generator matrix G, where k=n−m, is obtained from the H matrix using the following equation.

$$G=[I_k|(H_{n_0-1}^{-1}\cdot H_0|H_{n_0-1}^{-1}\cdot H_1|\ldots|H_{n_0-1}^{-1}\cdot H_{n_0-2})^T]$$

where $I_k$ is a binary identity matrix of size k. As an example, when $n_0=2$, and the QC-MDPC code rate is $$R = 1/2 \left(\text{i.e. } \frac{k}{n} = \frac{1}{2}\right),$$

the public key G matrix is simplified in accordance with the following equation.

$$G=[I_k|(H_1^{-1}\cdot H_0)^T]$$

The binary QC-MDPC Code-Based encryption method is similar to the original McEliece cryptosystem; that is, the plaintext message m is encoded using the public key G and an error vector e is intentionally added to the resulting codeword to obtain the ciphertext c. The encrypted ciphertext c may be transmitted over an unsecure transmission channel. The decryption process for the received ciphertext c however is modified from the McEliece method due to the lack of the auxiliary matrices P and S in the QC-MDPC method. Specifically, the decryption method is performed by decoding the ciphertext as a codeword using the private key H matrix.

To perform the binary QC-MDPC decoding operations, soft and hard decoding techniques that are developed for Low-Density Parity-Check (LDPC) codes including binary belief-prorogation (BP) and a bit-flipping (BF) algorithm may be applied. It is worth mentioning that more general GFq LDPC decoders have been developed as well. Unfortunately, using LDPC decoding techniques for decoding binary and non-binary QC-MDPC codes generally yields sub-optimal performance due to the difference in densities of the two types of codes. A modified bit-flipping decoding algorithm has been developed for binary QC-MDPC (but not for non-binary QC-MDPC) to improve its decoding optimality.

Binary QC-MDPC Code-Based cryptography is able to provide a significant key size reduction compared to the original McEliece code-based system with somewhat adequate improvements in computational complexities for the key generation, encryption and decryption processes. Still, there's a need to further ease the memory requirements and reduce the computational complexity of the cryptosystem and transmission delays in order to make it suitable for practical applications.

SUMMARY OF THE INVENTION

The present invention provides a method and apparatus for a code-based asymmetric cryptosystem which may include one or more of the following features.

First, there may be provided a more general class of QC-MDPC (Quasi-Cyclic Moderate Density Parity-Check) for a code-based cryptosystem where the binary QC-MDPC method is extended to QC-MDPC over a GFq (Galios Field) with q being an integer such that q≥2. The QC-MDPC over a GFq is not limited to q=2 as in the binary QC-MDPC encryption. Since linear codes over a GFq can provide better error correcting capability compared to binary codes, better decryption failure rates and shorter transmission delays with shorter ciphertext can be achieved through this extension.

Second, an apparatus may be provided for reducing the computational complexity of the key generation component of the code-based (binary and non-binary) QC-MDPC cryptosystem and for producing more compact security keys. In particular, to calculate the public key G, the computational operations which are the bottleneck of key generation are simplified to O(m log (m)) by a matrix inversion algorithm, a singularity detection algorithm and a dedicated FFT engine over the GFq to perform matrix multiplications. In addition, the private key size of the cryptosystem is compacted through the use of a compression procedure.

Third, an apparatus may be provided for a code-based GFq (binary and non-binary) QC-MDPC encryption process using the public key G with computational complexity O (M log(M)), wherein M is the size of the quasi-cyclic matrix. Mathematically, the computational complexity of the public key generation algorithm is on the order of M log(M). In an example, when M=1,000, the computational complexity is approximately 1000 log (1000)=6.9e3=6.9×10³ clock cycles. If M is increased to 10,000, the computational complexity is approximately 10000 log (10000)= 9.2e4=9.2×10⁴ clock cycles.

A quasi-cyclic matrix is a square matrix where each row in the matrix is a cyclic shift of the previous row. The matrix can be represented by the first row. Quasi-cyclic describes a square matrix with each row is cyclic shifted from the previous row. A cyclic shift describes the shifting of a row to the right by 1 with the rightmost element being shifted cyclically to the leftmost position. For instance [0123] when cyclically shifted becomes [3012]. An example of a quasi-cyclic matrix is shown below wherein the matrix has four rows, where the second row is a cyclic shift of the first row, the third row is a cyclic shift of the second row, and the fourth row is a cyclic shift of the third row.

| 0 1 2 3 |
| 3 0 1 2 |
| 2 3 0 1 |
| 1 2 3 0 |

The code-based GFq (binary and non-binary) QC-MDPC encryption process is done in several steps starting with extraction of GFq generator polynomials of length $(n_0-1)M$ from the generator matrix G (i.e. the public key) and mapping the plaintext message to the GFq format. It may then be followed by converting both GFq plaintext and generator polynomials into the frequency domain using one of two proposed types of Discrete Fourier Transforms, conducting the necessary manipulations on the transformed quantities to obtain a frequency domain ciphertext, and converting the resulting ciphertext from the frequency domain to the GFq sequence domain.

Fourth, an apparatus is provided to perform a code-based GFq (binary and non-binary) QC-MDPC decryption/decoding process using a form of private key matrix H.

DETAILED DESCRIPTION OF THE PREFERRED EMBODIMENTS

Figure 1:
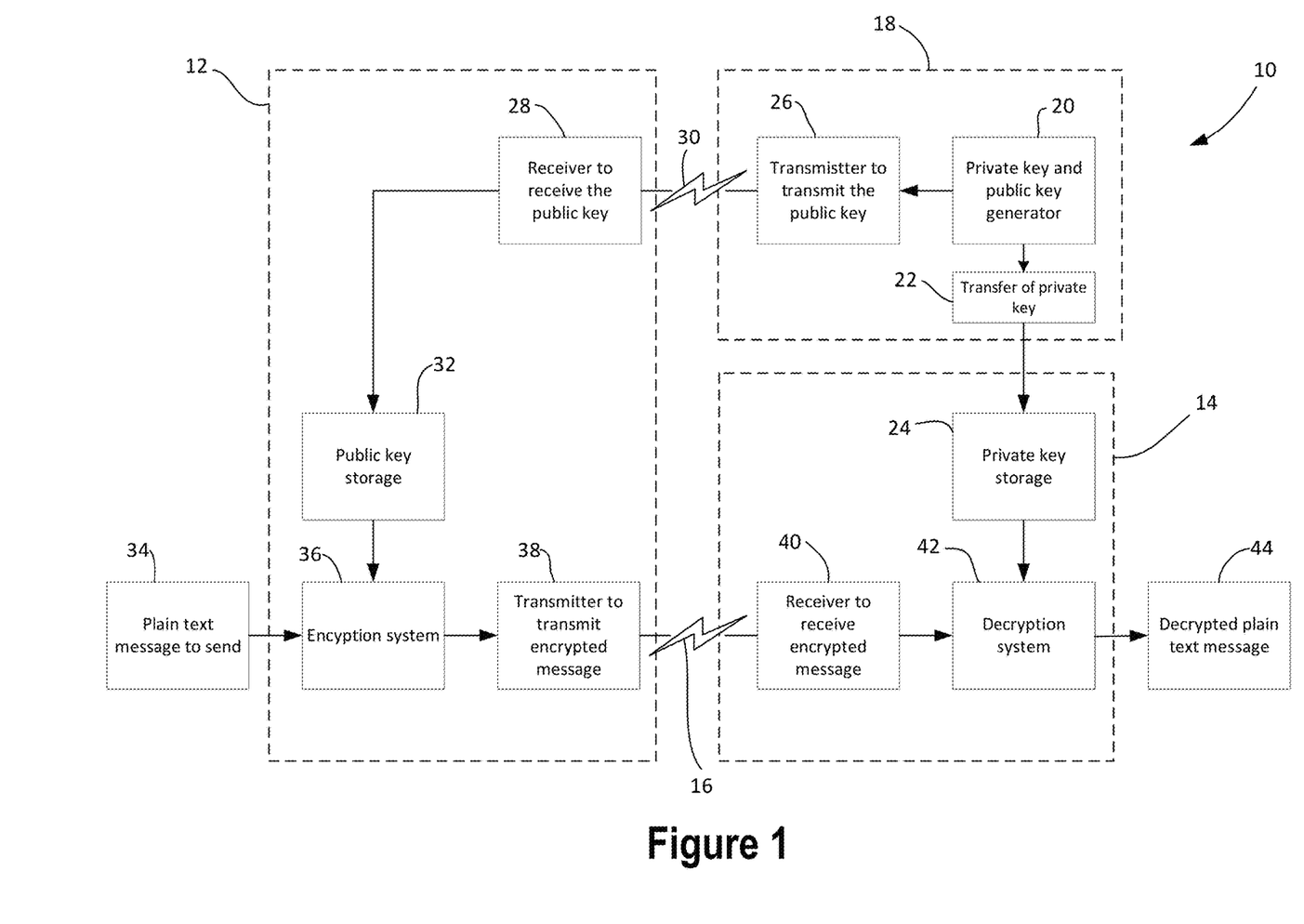
FIG. 1 is a functional block diagram of a system for secure communication between two parties over a non-secure communication channel using a public key and a private key.

FIG. 1 shows an example of a communication system 10 for secure communication from a sending device 12 to a receiving device 14 using a non-secure communication channel 16. The communication channel 16 may be any wired or wireless communication channel or may be a combination of the two. The communication channel 16 need not be secure and may carry communications that are accessible by the public. The sending and receiving devices 12 and 14 may be any type of device such as a computer device, server, tablet computer, smart phone or other phone, e-reader, personal digital assistant, television, wired or wireless communication device, or other device that may use secure communications.

A public key and a private key are each needed for the secure communication. A key generator system or device 18 may be used to generate the keys. The key generator system or device 18 may be part of the receiving device 18 or may be separate from the receiving device 14. For instance, the key generator system or device 18 may be included in a central system that distributes the keys. The key generator 18 may generate the keys in advance or when needed. The key generator system and device 18 includes a private key and public key generator 20. The private key that is generated by the generator 20 is transferred as indicated by block 22 to a private key storage 24. The private key storage 24 may be in the receiving device 14 or the key may be provided to the receiving device 14 as needed.

The public key generated by the generator 20 is transmitted from a transmitter 26 in the key generator system or device 18 to a receiver 28 in the sending device 12 over a communication channel 30. The communication channel 30 may be a public communication channel and need not be secure. The public key that has been received in the sending device 12 may be stored in a public key storage 32 for future use or may be requested when needed. A plain text message to send 34 is provided to an encryption system 36 of the sending device 12. The encryption system 36 uses the public key stored in the public key storage 32 to encrypt the plain text message 34 and thereby obtain an encrypted message. The encrypted message is provided to a transmitter 38 which transmits the encrypted message via the non-secure communication channel 16 to a receiver 40 in the receiving device 14. The received encrypted message is transferred from the receiver 40 to a decryption system 42 in the receiving device 14. The decryption system 42 obtains the private key from the private key storage 24 and performs the decryption, yielding a decrypted plain text message 44. This shows but one example of a communication system using the encryption.

A. Code-Based GFq QC-MDPC Key Generation

Figure 2:
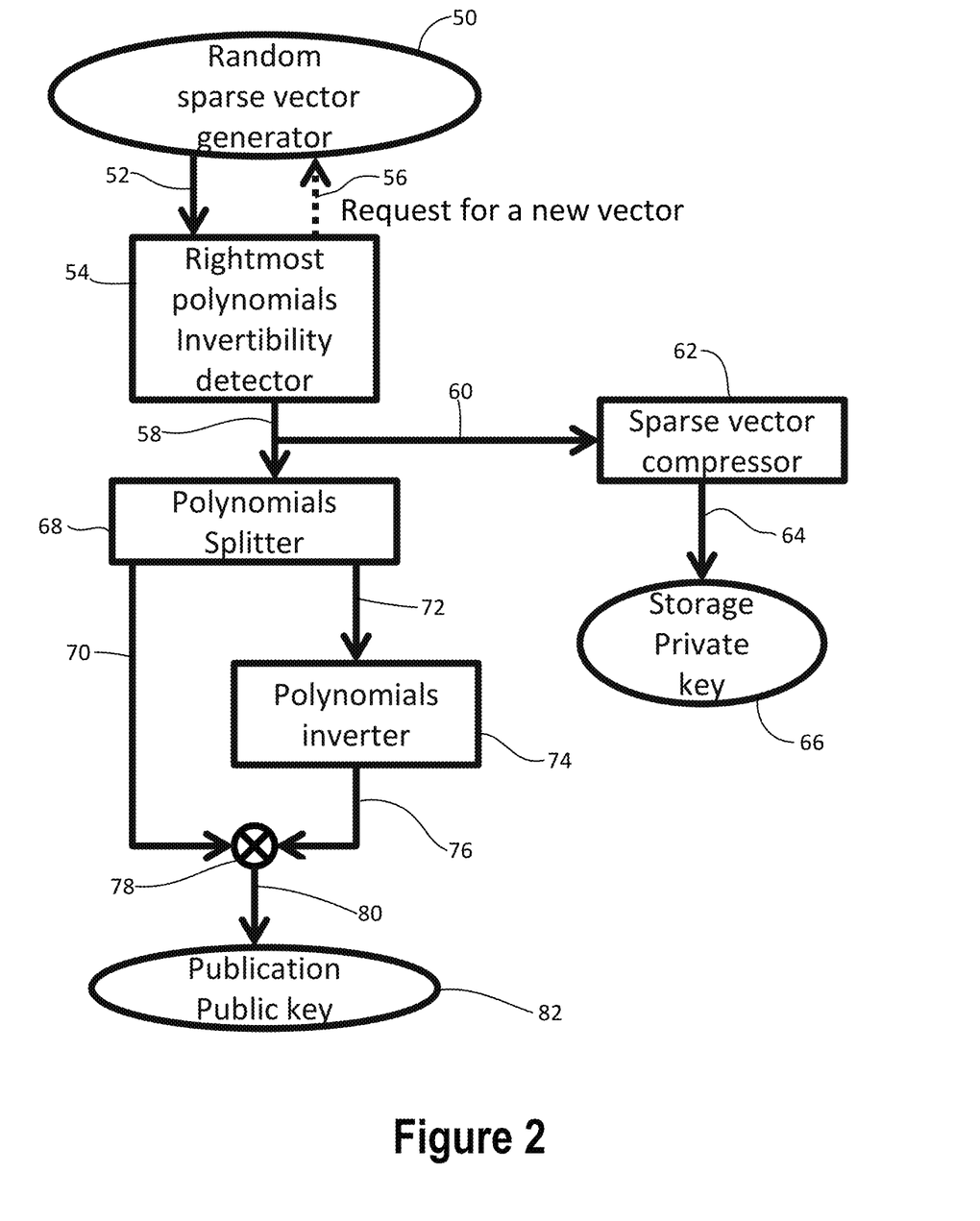
FIG. 2 is a functional block diagram of a key generation apparatus and method for generating a private key and a public key.

FIG. 2 illustrates an embodiment of an apparatus and method for QC-MDPC cryptosystem key generation in detail.

In this example, a QC-MDPC code in GFq is provided instead of GF2 (i.e. q=2) specified by its GFq parity check matrix $H_q^{M \times N}$, where $q \geq 2$, $$N = \frac{n}{\log_2(q)}, \text{ and } M = \frac{m}{\log_2(q)}.$$

The first row of the matrix $H_q^{M \times N}$ is defined as $h_q^{1 \times N}$.

In a first step, the private key is generated and stored in a suitable form in a private key storage. The private key may be generated in a user's device or in a central system or other device. The private key storage may be in the user's device, in a central system or other storage location The procedure for key generating is as follows: a random vector generator 50 outputs a temporary sparse row vector $\hat{h}_q^{1 \times N}$ as shown at 52 of weight W and sends it to a rightmost polynomial invertibility detector 54. The random vector generator 50 may be termed a random sparse vector generator or a random weight W vector generator in certain embodiments. The invertibility detector 54 determines whether a lifting matrix of the rightmost polynomial of the temporary sparse row vector $\hat{h}_q^{1 \times N}$ is singular, thus whether the vector is invertible. If the invertibility estimator or detector 54 returns a 'false' result for invertibility, then the rightmost polynomials' corresponding lifting matrix is singular, then this causes the temporary sparse row vector $\hat{h}_q^{1 \times N}$ to be discarded and causes a request for a new random sparse vector to be sent from the invertibility detector 54 to the random vector generator 50 as shown at 56. A lifting matrix is a matrix whose diagonal elements are 1s and only non-diagonal elements are nonzero. If the lifting matrix is invertibile and thus not singular, the detector 54 returns a 'true' result which indicates that the first row of the H matrix has been successfully generated. The successfully generated first row which may be referred to as row vector $h_q^{1 \times N}$ is output from the invertibility detector 54 as shown at output 58. A copy of the row vector $h_q^{1 \times N}$ is transmitted as shown at 60 to a sparse vector compressor 62 for processing to produce a more compact form of the vector, which may be referred to as $\tilde{h}_2^{1 \times L}$. The compressed vector $\tilde{h}_2^{1 \times L}$ is output by the compressor 62 as shown at 64 to a private key storage 66, where it is stored in the private key storage 66 as the private key.

Subsequently, the public key is computed using the following procedure: The successfully generated row vector $h_q^{1 \times N}$ is output as shown at 58 and is sent to a polynomials splitter 68 that splits the N polynomials of the row vector into $n_0$ streams each having a length M. Using the example of $n_0=2$, the first stream consists of the first M symbols of the row vector, which are polynomials $h_q^{0 \leq i < M}$ that are output as shown at 70 to a multiplier 78. The second stream is the rightmost polynomials $h_q^{N-M \leq i < N}$ which are the last M symbols of the row vector and which are output by the polynomial splitter 68 at 72. The rightmost polynomials on the output 72 are sent to a polynomials invertor 74, which computes the polynomials' inverses in a ring. The polynomials invertor 74 then outputs the first row of the rightmost matrix as a polynomial $(h_q^{N-M \leq i < N})^{-1}$ as shown at output 76. The two polynomials on the outputs 70 and 76 are sent to a circulant polynomials multiplier 78. The output of the polynomials multiplier 78 which is shown at 80 is the public key $g_q^{(n_0-1) \times M}$, which is in the form of a generator polynomial which will be sent for publishing in a public key publishing block 82. The publishing block 82 represents the publishing of the public key or generator polynomial to a user. The public key may be published in advance to the user or may be published when needed for a communication. The publication of the public key may include transmitting the public key on a public communication channel to a user or to a storage device from which it may be retrieved by a user seeking to use the public key.

All of the components 50-82 shown in FIG. 2 may be provided within a device such as a computer, computer system, network, mobile device, server or other device or system. In some embodiments, the publishing block 82 may be outside the device or system for publication of the public key for example by an third party device or system.

Encryption of messages, transmission of encrypted messages, and decryption of the transmitted encrypted message may be performed using the public key and private key generated by this method.

B. Code-Based GFq QC-MDPC Encryption

Two configurations are provided to carry out the encryption process for GFq QC-MDPC code-based cryptosystem. The first configuration utilizes a Number Theory Transform (NTT) while the second configuration uses a complex FFT (Fast Fourier Transform). The FFT based encryption and the NTT based encryption are two different ways to conduct the encryption and get the same results. The NTT based encryption does not need an FFT engine, since the NTT is a fast engine itself. Both FFT and NTT encryption share the same matrix inversion and singularity detection steps.

In this specification, a first configuration is described using the general value of the design parameter $n_0$ while in a second configuration the value $n_0=2$ is used for the purpose of illustration and ease of description. The invention is not limited to these values. The generalization to other values of $n_0$ is straightforward as will be understood by those of skill in this art.

Figure 3:
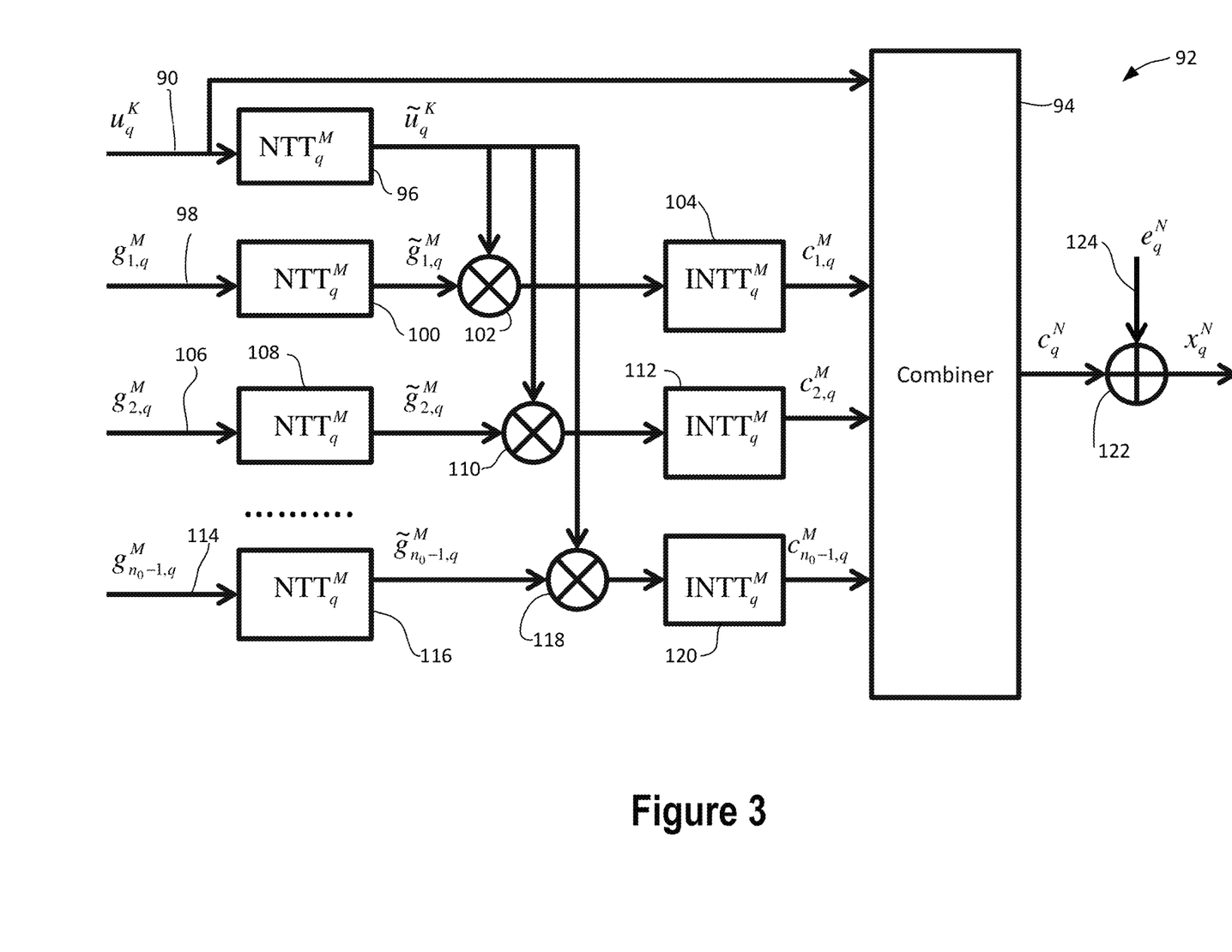
FIG. 3 is a functional block diagram of an apparatus for encryption of a plaintext message using NTT and INTT methods according to a first embodiment.

1) NTT-Based Encryption:

A proposed apparatus for QC-MDPC cryptosystem encryption using number theory transform (NTT) and inverse number theory transform (INTT) is illustrated in FIG. 3. An example of encryption using the public key as generated in FIG. 2 is shown.

A plaintext message m is to be sent as an encrypted message using the public key. The message m is converted to components $u_q^K$, where q is the size of the finite field (GFq) and K is the length of the plaintext in units of the finite field symbol. An example of converting plaintext message as a vector $\vec{m}$ to $u_q^K$, assume the plaintext message vector $\vec{m}$ has 6 binary bits as follows: $\vec{m}=011011$ (binary bits). Assume a finite field size q is 4, which means each finite symbol has 2=(log 2(4)) binary bits. A length of the GF4 plaintext K=6/2=3, can map to the plaintext message vector in to $u_q^K$ as follows:

$u_q^K=123$(*GF4* symbol), where 01→1, 10→2, and 11→3.

In another example, a plaintext message m="The meeting is at 3:00 pm," is to be sent. The message m has 26 bytes each of 8 bits. The bit total is 26*8=208 binary bits. This results in 208/log(4)=104 GF4 symbols to be encrypted.

In FIG. 3, the plaintext component $u_q^K$ is provided to an input 90 of an encryption device 92. The plaintext component $u_q^K$ is input directly to a combiner 94 and is also input to a number theory transform (NTT) engine 96 which generates a transformed plaintext component $\tilde{u}_q^K$. A first generator component $g_{1,q}^M$ of the public key is provided to an input 98 of an NTT engine 100 which generates a transformed generator component $\tilde{g}_{1,q}^M$. The first generator component $g_{1,q}^M$ is a generator polynomial of length fM. The output of the NTT engine 100 is provided to a multiplier 102, which may be a polynomials multiplier, that also receives the output of the NTT engine 96. The multiplier 102 combines the two signals and provides the result to an Inverse Number Theory Transform (INTT) engine 104, which generates a first codeword component $c_{1,q}^M$ that is provided to the combiner 94.

A second generator component $g_{2,q}^M$ is provided to an input 106 of the encryption device 92 for processing by an NTT engine 108 to produce a transformed generator component $\tilde{g}_{2,q}^M$ that is provided to a multiplier 110 for combination with the transformed plaintext component $\tilde{u}_q^K$. Once combined by the multiplier 110, the result is provided to an INTT engine 112 which generates a second codeword component output $c_{2,q}^M$. that is provided to the combiner 94. As indicated by the dotted line between the NTT engine 108 and a last NTT engine 116, additional inputs may be provided to a similar arrangement of elements.

Each generator component undergoes a similar process, including the last generator component $g_{n0-1,q}^M$ at input 114 that is provided to an NTT engine 116 to generate a transformed last generator component $\tilde{g}_{n0-1,q}^M$ that is mixed with the transformed message component $\tilde{u}_q^K$ in a multiplier 118, the result of which is inverse transformed in an INTT engine 120 to generate the last codeword component $c_{n0-1,q}^M$ that is provided to the combiner 94. The combiner 94 combines the codeword components output from the INTT engines, including from any additional INTT engines as indicated by the dotted line, into a codeword $c_q^N$. The codeword $c_q^N$ is input to a multiplier 122 which mixes the codeword with an error signal $e_q^N$ that is provided at 124 to provide an encrypted cyphertext $x_q^N$.

Figure 4:
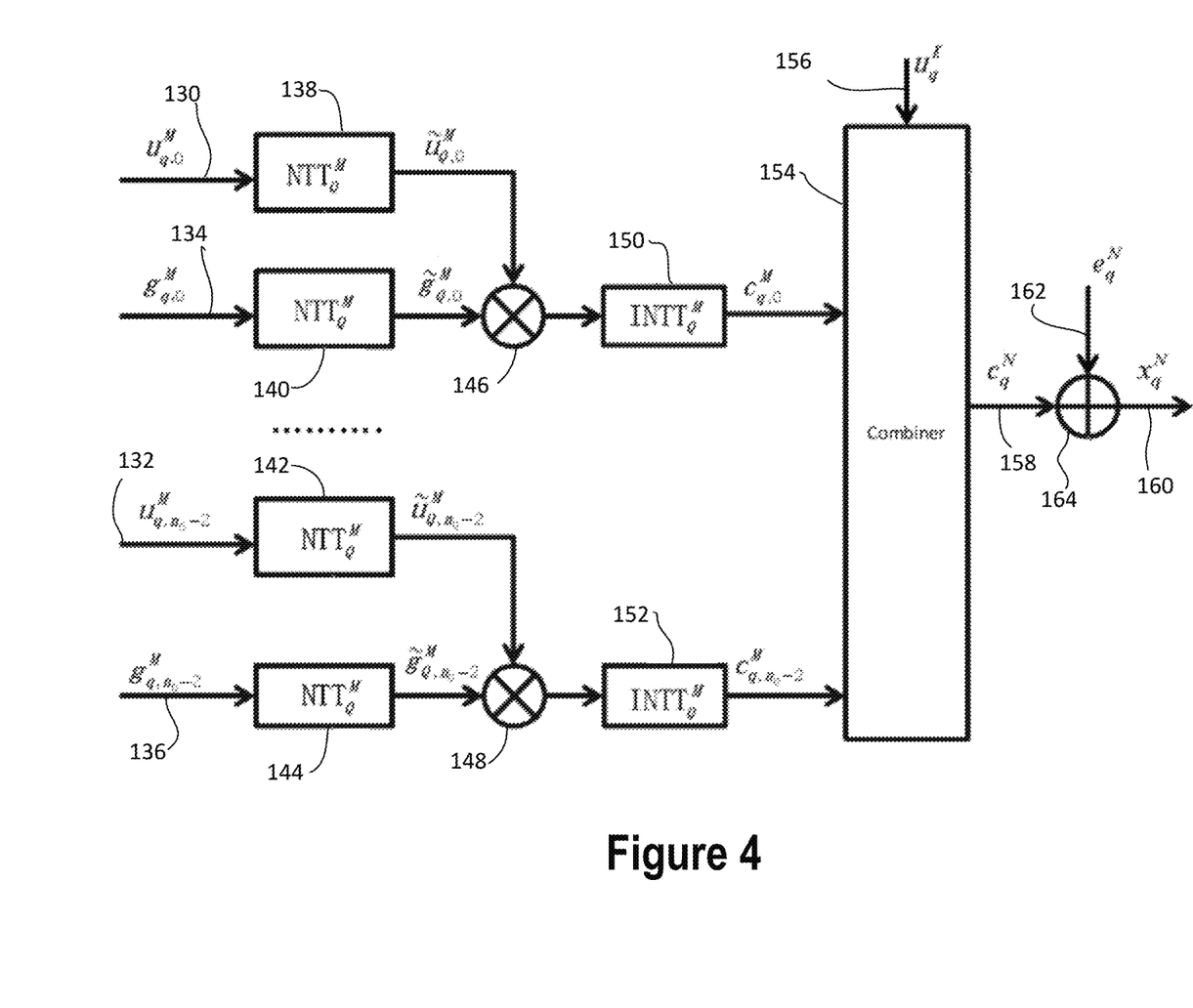
FIG. 4 is a functional block diagram of an apparatus for encryption of a plaintext message using NTT and INTT methods according to a second embodiment.

An alternate embodiment of an encoder is shown in FIG. 4. The primary difference over the first embodiment is that the plaintext is divided into components prior to processing. In particular, the plaintext component $u_q^K$ is divided into $n_0-1$ polynomial components, each having length M and labelled as $u_{M,i}^K$ ($0 \le i \le n_0-2$) and input at 130 and 132, as well as other possible inputs as indicated by the dotted line between the blocks 140 and 142. Similarly, the generator polynomials are divided into $n_0-1$ polynomial components of length M and labelled as $g_{q,i}^M$ ($0 \le i \le n_0-2$) and input at 134 and 136, as well as other possible inputs as indicated by the dotted line. Afterwards, the sets of polynomial components are expanded from GFq to $GF_Q$, with Q satisfying the equation:

$$Q=2^{\lceil log2(M) \rceil}$$

The resulting two sets of $GF_Q$ plaintext and generating polynomial components are then transformed to frequency domain signals $\tilde{u}_{Q,i}^M$ and $\tilde{g}_{Q,i}^M$, i=0, . . . , $n_0-2$ respectively using NTT engines 138, 140, 142 and 144. Subsequently, the frequency domain plaintext and generating polynomial components are paired up according to their matching indices and multiplied by multipliers 146 and 148, for example. The output signal of the multiplication is then transformed back to the $GF_Q$ sequence domain using INTT engines 150 and 152 and shrunk back to the original GFq sequence domain to yield $n_0-1$ codeword parity components $c_{q,i}^M$, i=0, . . . , $n_0-2$. Other similar arrangements for producing codeword parity components may be provided as indicated by the dotted line. A combiner 154 assembles the codeword parity components into codeword parity and merges it with $u_q^K$ as shown at 156 to form QC-MDPC codeword $c_q^N$ as shown at 158. Finally, the ciphertext denoted by $x_q^N$ as shown at 160 is obtained by adding a sparse GFq error vector $e_q^N$ as shown at 162 of weight W to the codeword $c_q^N$ using a multiplier 164. The result is an encrypted message that may be communicated over non-secure communication channels.

Figure 5:
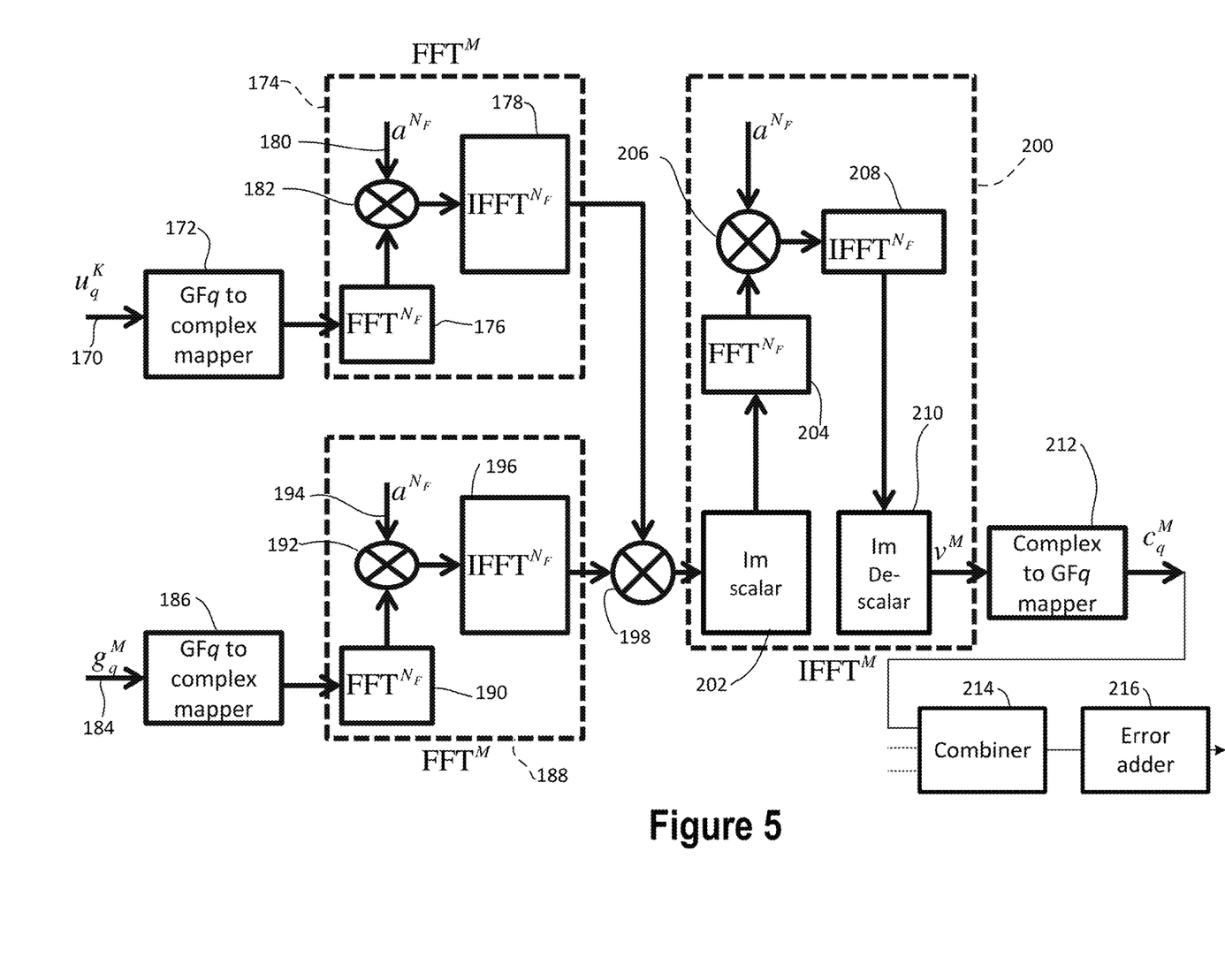
FIG. 5 is a functional block diagram of an apparatus and method for QC-MDPC encoding.

2) FFT-Based Encryption:

In a further embodiment of the apparatus and method is provided a QC-MDPC cryptosystem encryption using FFT (Fast Fourier Transform) and corresponding to $n_0=2$, which is show in detail in FIG. 5.

In FIG. 5, the plaintext component $u_q^K$ as show at 170 is mapped into a complex signal of length K using a GFq to complex mapper 172. The resulting signal will be transformed to the frequency domain using a convolutional $FFT^M$ module 174 with size M. Since M is a prime number, the calculations of the convolutional FFT module 174 may be performed by an FFT/IFFT arrangement with a larger size $N_F$ than M and a signal $a^{N_F}$ as shown at 180 that is pre-calculated as shown inside the convolutional FFT module 174. In particular, the output of the GFq to complex mapper 172 is provided to an $FFT^{N_F}$ module 176, the output of which is provided to a multiplier 182 that receives the signal $a^{N_F}$. The mixed signal is provided to an $IFFT^{N_F}$ (Inverse Fast Fourier Transform) module 178. The values $N_F$ obtained as the product of small prime numbers and the signal $a^{N_F}$ 180 is a pre-calculated sequence. The output from the convolutional $FFT'$ 174 is a frequency domain plaintext with size K(K=M).

In further detail, the convolutional $FFT^M$ module 174 of size M is a large prime number which cannot be factored. For example, M could be equal to 4091. If the size of an FFT is a prime number, there is no way to accelerate processing the transform using a butterfly or radix structure. A butterfly structure is a portion of a computation that combines smaller Fourier transforms into a larger Fourier transform. The name butterfly comes from the shape of the data flow diagram in the radix case. The speed of the Fourier transform with a large prime number size M can be enhanced using a FFT with a slightly larger non-prime number of size $N_F$. The $FFT^{N_F}$ module 176 with a non-prime number size uses a number that can be factored into small prime numbers. For example, the value $N_F$ may be 4096, which is a little larger than 4091 and that is equal to $2^{12}$. When the FFT has a non-prime size that can be factored into small prime numbers, the butterfly or radix structure can be used to enhance the speed of the FFT. Use of a slightly larger FFT with non-prime size $N_F$ that can be factored into small prime number is referred to as a convolutional FFT. The convolutional FFT may be used to enhance the speed of a Fourier transform with a large prime number M.

In parallel, a similar procedure is provided to transform the generator polynomials $g_q^M$ that are input at 184. In particular, the generator polynomials are processed by a GFq to complex mapper module 186 that inputs the value to a convolutional $FFT^M$ module 188 that includes an $FFT^{N_F}$ module 190. The output of the module 190 is provided to a multiplier 192 where it is mixed with a signal $a^{N_F}$ at 194 and provided to an $IFFT^{N_F}$ module 196. The output of the convolutional $FFT^M$ module 188 is in the form of frequency domain generator polynomials with size M.

The transformation signals at the output of the module 196 is output from the convolutional FFT module 188 to a multiplier 198. The other input to the multiplier 198 is the transformation output of the convolutional FFT module 174. The transformation signals undergo a dot multiplications process using the multiplier 198 to provide a generated signal. Then, the generated signal is inverse transformed from the frequency domain using an IFFT module 200. In particular, the inverse transform module 200 receives the output of the multiplier 198 at an Im scalar 202 which sends its output to an $FFT^{N_F}$ module 204 that performs a transform on the scaled signal. A multiplier 206 receives the output of the FFT module 204 and mixes it with a signal $a^{N_F}$ at the multiplier 206, which is inverse transformed in an $IFFT^{N_F}$ module 208. The inverse transformed signal is input to an Im descalar 210 to generate a signal $v^M$ that is output from the $IFFT^M$ module 200. The output signal $v^M$ of size M is re-mapped back to the GFq sequence domain using a complex to GFq mapper 212. At the output of the mapper 212 is obtained the parity symbol component $c_q^M$ of the codeword. The parity symbol component $c_q^M$ output by the complex to GFq may be provided as a simple stream output by adding an error signal to the component. A combiner may be unnecessary in this embodiment. Alternately, a plurality of similar circuits may be provided to process a plurality of plaintext components. For example, the processing of the components by the circuits may be performed in parallel. The outputs of the circuits may be combined with one another in a combiner 214 prior to an error signal being added to the combined output. In particular, like the embodiments shown in FIGS. 3 and 4, the embodiment of FIG. 5 combines the parity symbol components $c_q^M$ of the illustrated circuit portion with components from similar circuit portions using the combiner 214. The output of the combiner 214 is mixed with an error signal at 216 to obtain the codeword. The combiner 214 combines the output of complex to GFq de-mapper signals with the original plaintext followed with the error adder 216. The combiner 214 and the error signal adder 216 are shown as block elements in FIG. 5 for the sake of simplifying the drawing, but include the features of the corresponding elements of FIGS. 3 and 4.

A message that has been encrypted according to the embodiments shown in FIG. 3, 4 or 5 may be communicated over a non-secure channel communication without the message being understood should it be intercepted.

C. Code-Based GFq QC-MDPC Decryption

Figure 6:
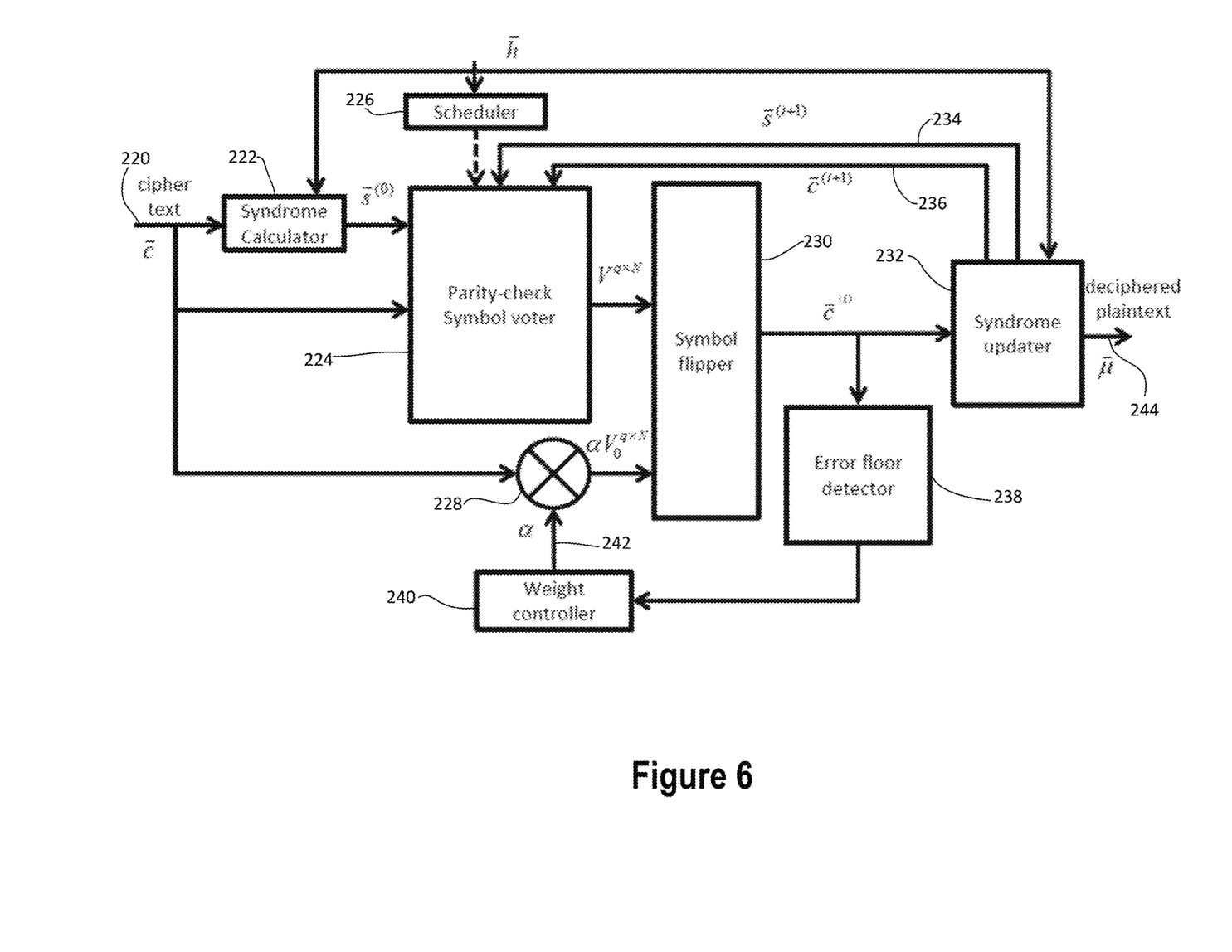
FIG. 6 is a functional block diagram of an apparatus and method for QC-MDPC decryption.

An embodiment of an apparatus and method for iterative QC-MDPC decryption is shown in detail in FIG. 6.

An encrypted message has been received, such as via a non-secure communication channel and is to be decrypted so that it may be understood. The received ciphertext $c_q^N$, which may also be designated as $\vec{c}$, is provided to an input 220 and is sent to a syndrome calculator 222, where the initial syndrome $s_q^{(0)}$, also designated $\vec{s}^{(0)}$, is calculated using the parity-check polynomial $h_q^N$. At the same time, a copy of the ciphertext $s_q^{(i)}$ or $\vec{s}^{(0)}$ is sent to the parity-check symbol voter block 224. In the parity-check symbol voter block 224, scheduling information obtained from a scheduler 226 and a current syndrome $s_q^{(i)}$ or $\vec{s}^{(0)}$ from the syndrome calculator 222 are used together to generate a vote for the current hard estimation for ciphertext $\hat{c}_q^M$. The parity-check symbol voter 224 outputs an integer matrix $V^{q \times N}$, which describes how many checks votes for the qth index for each symbol.

On the other portion of the decryption system, the original ciphertext $c_q^N$ or $\vec{e}$ is sent to a multiplier 228, which converts each ciphertext symbol to a q by 1 integer vector $\alpha V_0^{q \times N}$, which has only one non-zero value a in the GFq index, by mixing the ciphertext symbol with a. For example, if the first ciphertext symbol is 2 in GF4, the first column of the converted vector is $\alpha V_0^{q \times 1} = [0, 0, \alpha, 0]^T$.

Subsequently, the output $V^{q \times N}$ of the parity-check symbol voter 224 and the output $\alpha V_0^{q \times N}$ of the multiplier 228 are both sent to a symbol flipper 230. The symbol flipper block

230 conducts a hard decision for each ciphertext symbol. Firstly, it adds the outputs $V^{q \times N}$ of the symbol voter 224 and $\alpha V_0^{q \times N}$ of the multiplier 228 together, and finds the index with the largest votes as the estimated ciphertext symbols for the (i)th iteration $\hat{c}_q^{N^{(i)}}$ also indicated as $\vec{c}^{(i)}$. If there is more than one index that has equal large votes, it randomly chooses one of the indexes between them.

The estimated ciphertext symbols $\hat{c}_q^{N^{(i)}}$ or $\hat{c}^{(i)}$ is provided into two blocks: First, the symbols are provided to a syndrome flipping updater 232 to update the syndrome using only the flipped ciphertext. If the syndrome $S_q^{(i+1)}$ also designated as $\vec{s}^{(i+1)}$ is provided on output 234 of the syndrome updater 232 is all zeros, it means the decoding is successful, and the deciphered plaintext $\mu_q^K$, also designated as $\vec{\mu}$, is outputted from the syndrome updater 232 on output 244.

If the syndrome $S_q^{(i+1)}$ or $\vec{s}^{(i+1)}$ on the output 234 of the syndrome updater 232 is are not all zeros, the syndrome updater 232 sends a signal $\hat{c}_q^{N^{(i+1)}}$, which is also designated $\vec{c}^{(i+1)}$, on output 236 and syndrome $S_q^{(i+1)}$ or $\vec{s}^{(i+1)}$ on output 234 back to the parity check symbol voter 224 for a next iteration.

Second, the output of the symbol flipper 230 is provided to an error floor detector 238, which detects whether the iteration changes any symbol in the last two iterations or not. The detection result is sent back to a weight controller 240. The weight controller 240 keeps the current weight a unchanged if no error floor is detected. Otherwise, the weight controller reduces the weight a as shown at 242.

The decryption steps continue until the plaintext message $\mu_q^K$ or $\vec{\mu}$ has been decoded and provided on the output 244. A decryption of the message has been performed.

Methods and apparatus for code-based asymmetric cryptosystem using Quasi-Cyclic Moderate-Density Parity-Check (QC-MDPC) error correcting codes are provided. Specifically, the methods and apparatus generalizes the framework of (QC-MDPC) Code-Based (CB) cryptography from the binary domain (using a Galois Field of two elements) to an arbitrary size of Galois Field and provides an apparatus for implementing the cryptosystem with a simplified computational complexity of key generation, encryption, and decryption components of the cryptosystems and reduced sizes of the public and private security keys.

Thus, there is shown and described an asymmetric-key cryptosystem. The asymmetric-key cryptosystem has three main components:

Key generation: A public key and a private key are generated to be used for encryption and decryption.

Encryption: a message from "Bob" to "Alice" is encrypted using Alice's public key and sent from Bob to Alice through potentially un-secure communication channels.

Decryption: Alice uses her private key to decrypt Bob's message (Only the owner of the private key is able to successfully decrypt the message)

Although other modifications and changes may be suggested by those skilled in the art, it is the intention of the inventors to embody within the patent warranted hereon all changes and modifications as reasonably and properly come within the scope of their contribution to the art.

We claim:

1. A method for encrypting a message using a quasi-cyclic moderate density parity check code over a Galois field, comprising:

converting a message to be encrypted into plurality of message components;
transforming a message component of the plurality of message components to obtain a transformed message component;
transforming a first component of a public key to obtain a first transformed generator component;
multiplying the transformed message component with the first transformed generator component to obtain a first multiplied output;
inverse transforming the first multiplied output to obtain a first codeword component;
transforming a second component of the public key to obtain a second transformed generator component;
multiplying the transformed message component with the second transformed generator component to obtain a second codeword component;
combining the first codeword component and the second codeword component to obtain a codeword; and
multiplying the codeword with an error signal to obtain an encrypted ciphertext.

2. A method as claimed in claim 1, wherein the transforming steps are performed using number theory transform engines; and
wherein the inverse transforming steps are performed using inverse number theory transform engines.

3. A method as claimed in claim 1, further comprising:
generating a random sparse row vector with elements from a Galois Field (GFq) and with a prescribed vector weight;
splitting the sparse row vector into a plurality of polynomials including a left polynomial and a plurality of rightmost polynomials;
inverting the rightmost polynomials to provide an inverted rightmost polynomials; and
circulant multiplying the left polynomials and the inverted rightmost polynomials to obtain a generator polynomial, wherein the generator polynomial is the public key.

4. A method for encrypting a message using a quasi-cyclic moderate density parity check code over a Galois field, comprising:
mapping a component of a plaintext message into a Galois field using a complex mapper to obtain a mapped message component;
transforming the mapped message component using a fast Fourier transformer to obtain a transformed message component, wherein the transforming of the mapped message component includes transforming the mapped message component in a fast Fourier transformer having a size M equal to a prime number, the fast Fourier transformer of size M including a fast Fourier transformer of size $N_F$ and an inverse fast Fourier transformer of size $N_F$, where $N_F$ is larger than M, an output of the fast Fourier transformer of size $N_F$ being mixed with a predetermined signal prior to being provided to an input of the inverse fast Fourier transformer of size $N_F$;
mapping a generator polynomial into a Galois field using a complex mapper to obtain a mapped generator component;
transforming the mapped generator component using a fast Fourier transformer to obtain a transformed generator component;
multiplying the transformed message component with the transformed generator component to obtain a mixed output;

inverse transforming the mixed output to obtain an inverse signal;

mapping the inverse signal into a complex to Galois field mapper to obtain a component of a codeword;

repeating the above elements for each component of the plaintext message;

combining the components of the codeword into a codeword; and adding an error signal to the codeword to obtain an encrypted message.

5. A method as claimed in claim 4, wherein the inverse transforming of the mixed output includes inverse transforming using an inverse fast Fourier transformer of size M including a fast Fourier transformer of size $N_F$ and an inverse fast Fourier transformer of size $N_F$, the output of the fast Fourier transformer of size $N_F$ being mixed with a predetermined signal prior to being provided to the input of the inverse fast Fourier transformer of size $N_F$.

6. A method as claimed in claim 5, further comprising:

Im scaling the mixed output provided to the inverse fast Fourier transformer of size M to obtain a scaled signal for input to the fast Fourier transformer of size $N_F$; and Im descaling an output of the inverse fast Fourier transformer of size $N_F$ to obtain an output of the inverse fast Fourier transformer of size M.

7. A method for encrypting a message using a quasi-cyclic moderate density parity check code over a Galois field, comprising:

mapping a component of a plaintext message into a Galois field using a complex mapper to obtain a mapped message component;

transforming the mapped message component using a fast Fourier transformer to obtain a transformed message component;

mapping a generator polynomial into a Galois field using a complex mapper to obtain a mapped generator component;

transforming the mapped generator component using a fast Fourier transformer to obtain a transformed generator component;

multiplying the transformed message component with the transformed generator component to obtain a mixed output;

inverse transforming the mixed output to obtain an inverse signal, wherein the inverse transforming of the mixed output includes inverse transforming using an inverse fast Fourier transformer of size M including a fast Fourier transformer of size $N_F$ and an inverse fast Fourier transformer of size $N_F$, where $N_F$ is larger than M, the output of the fast Fourier transformer of size $N_F$ being mixed with a predetermined signal prior to being provided to the input of the inverse fast Fourier transformer of size $N_F$;

mapping the inverse signal into a complex to Galois field mapper to obtain a component of a codeword;

repeating the above elements for each component of the plaintext message;

combining the components of the codeword into a codeword; and adding an error signal to the codeword to obtain an encrypted message.

8. A method as claimed in claim 7, further comprising:

Im scaling the mixed output provided to the inverse fast Fourier transformer of size M to obtain a scaled signal for input to the fast Fourier transformer of size $N_F$; and Im descaling an output of the inverse fast Fourier transformer of size $N_F$ to obtain an output of the inverse fast Fourier transformer of size M.

* * * * *